UNITED STATES PATENT OFFICE 2,162,178

X-RAY SHIELDING COMPOUND

Martin Marasco, Parlin, N. J., and Edwin Atkins Merritt, Chevy Chase, Md., assignors to Du Pont Film Mfg. Corp., New York, N. Y., a corporation of Delaware No Drawing. Application January 19, 1937, Serial No. 121,372

8 Claims. (Cl. 250—108)

This invention relates to plastics, more particularly to a hand-moldable shielding compound, resistant or opaque to X-rays.

A principal object of this invention is to provide an X-ray shielding compound which can be molded to any desired shape at room temperature. Another object is to provide such a compound that will be non-adhesive, non-toxic and sterilizable. A further object is to provide such a compound that will retain its shape while in use but which will be readily remoldable and re-usable.

Other more specific objects will appear from the detailed description herein presented in exemplification but not in limitation of this invention.

Various forms of X-ray treatment especially lesions about the face, nose, eyes, etc., require the localization of the rays so that undiseased portions will not be harmfully affected. This is usually accomplished by means of a series of lead cones. In treatments of this sort it has been found that the novel plastic herein described has proven extremely valuable in confining the rays to the area to be treated as well as affording improved technique and increased comfort to the patient.

A preferred embodiment of the present invention provides an X-ray shielding compound comprising a mixture of a vinyl derivative, a cellulose ester, a methacrylate polymer, a cellulose ether, an acroloid, a vinyloid or an interpolymer or compound resin or a mixed cellulose derivative plasticized with triphenyl phosphate or dibutyl phthalate or other plasticizers and modified with a greasy substance such as vaseline, cold cream, diglycol laurate, ethyl palmitate and perfumed with a small amount of material with a desirable odor, and mixed with a large proportion of metallic dust such as lead powder or litharge. Any suitable antiseptic may also be added if desired. In place of the metallic dust barium sulphate or barium fluoride may be used but the lead dust is preferred. In place of the above mentioned plasticizers ethyl lactate or glycol phthalate may be substituted, or mixtures thereof used.

A preferred formula for the herein described for the novel X-ray shielding compound is shown in the following example:

| I. | Grams |
|---|---|
| Polyvinyl acetate | 27 |
| Dibutyl phthalate | 24 |
| Diglycol laurate | 9 |
| Lead powder (fine dust) | 750 |
| Acetone | 69 |

The compound is prepared by dissolving the vinyl derivative in the acetone or a similar suitable solvent, then stirring in the other ingredients, pour into a shallow receptacle, preferably of glass, and allowing the acetone to evaporate. The following formula shows preferred variations in the proportions of the above-mentioned ingredients:

| II. | Percent |
|---|---|
| Polyvinyl acetate (binder) | 6 to 30 |
| Dibutyl phthalate (plasticizer) | 3 to 15 |
| Diglycol laurate (tempering or stickiness modifying agent) | 1 to 5 |
| Lead powder (fine dust) | 50 to 90 |

To mix these ingredients acetone in approximately 7% of their volume is preferably added.

It is apparent that a variety of materials are available for use as a binding agent. However, these may be broadly described as the vinyl and substituted vinyl compounds either co-polymerized or inter-polymerized, or polymerized to compounds such as polyvinyl acetate, methyl methacrylate and poly-acrylic acid esters, etc.

The above description and examples are intended to be illustrative only. Any modification of or variation therefrom which conforms to the spirit of the invention is intended to be included within the scope of the claims.

We claim:

1. An X-ray shielding material comprising a composition of matter, plastic at room temperatures, composed principally of lead powder, and which includes polyvinyl acetate, a plasticizer, and a tempering agent for counteracting the adhesive qualities of said composition.

2. An X-ray shielding material comprising a composition of matter, plastic at room temperatures, composed principally of lead powder, and which includes polyvinyl acetate, dibutyl phthalate, and a tempering agent for counteracting the adhesive qualities of said composition.

3. An X-ray shielding material comprising a composition of matter, plastic at room temperatures, composed principally of lead powder, and which includes polyvinyl acetate, dibutyl phthalate and diglycol laurate.

4. An X-ray shielding material comprising a composition of matter, plastic at room temperatures, comprising approximately 50% to approximately 90% metallic lead dust, polyvinyl acetate, dibutyl phthalate, and a stickiness modifying agent for counteracting the adhesive qualities of said composition.

5. A composition of matter consisting in approximate proportions of 90% lead powder, 3% dibutyl phthalate, 1% diglycol laurate, and 6% polyvinyl acetate.

6. A non-adhesive X-ray shielding material comprising a composition of matter, hand-moldably plastic at room temperature, and containing a finely divided material shieldingly resistant to X-rays, a binding agent chosen from the group comprising the polymerized, co-polymerized, inter-polymerized vinyl and substituted vinyl groups, a plasticizer, and a stickiness modifying agent for counteracting the adhesive qualities of said composition.

7. A non-adhesive X-ray shielding material comprising a composition of matter, hand-moldably plastic at room temperature, and containing a finely divided material shieldingly resistant to X-rays, a binding agent chosen from the group comprising the vinyl and substituted vinyl groups either co-polymerized or inter-polymerized, or polymerized to compounds such as polyvinyl acetate, methyl methacrylate and poly-acrylic acid esters, a plasticizer, and a stickiness modifying agent for counteracting the adhesive qualities of said composition.

8. A composition of matter consisting in approximate proportions of 50% to 90% lead powder, 3% to 15% dibutyl phthalate, 1% to 5% diglycol laurate, and 6% to 30% polyvinyl acetate.

MARTIN MARASCO.
EDWIN ATKINS MERRITT.